United States Patent
Lee et al.

(10) Patent No.: US 12,085,808 B2
(45) Date of Patent: Sep. 10, 2024

(54) DISPLAY APPARATUS

(71) Applicant: SAMSUNG ELECTRONICS CO., LTD., Suwon-si (KR)

(72) Inventors: Youngmin Lee, Suwon-si (KR); Jaewoo Kim, Suwon-si (KR); Hyungsuk Kim, Suwon-si (KR); Hyukjun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/142,355

(22) Filed: May 2, 2023

(65) Prior Publication Data
US 2024/0027832 A1    Jan. 25, 2024

Related U.S. Application Data

(63) Continuation of application No. PCT/KR2023/004984, filed on Apr. 13, 2023.

(30) Foreign Application Priority Data

Jul. 19, 2022 (KR) .................. 10-2022-0089210

(51) Int. Cl.
*G02F 1/13357* (2006.01)
(52) U.S. Cl.
CPC ............................ *G02F 1/133608* (2013.01)
(58) Field of Classification Search
CPC .................................................. G02F 1/133608
See application file for complete search history.

(56) References Cited

U.S. PATENT DOCUMENTS 7,163,319 B2 * 1/2007 Kuo .................. F21S 8/00
                                                       362/306
7,604,390 B2 * 10/2009 Zhang .............. G02F 1/133608
                                                       362/633
(Continued)

FOREIGN PATENT DOCUMENTS

JP         9-22649 A      1/1997
JP         5265694 B2     8/2013
(Continued)

OTHER PUBLICATIONS

International Search Report (PCT/ISA/210) issued on Jul. 31, 2023 by the International Searching Authority in International Patent Application No. PCT/KR2023/004984.
(Continued)

*Primary Examiner* — Bryon T Gyllstrom
(74) *Attorney, Agent, or Firm* — Sughrue Mion, PLLC

(57) ABSTRACT

A display apparatus includes: an optical member; a substrate provided at a rear side of the optical member, the substrate including a through-hole and a circuit pattern on a front surface of the substrate; a metal structure provided at a rear side of the substrate; and a supporter provided on the front surface of the substrate, wherein the supporter includes: a body supporting the optical member, the body being provided on the front surface of the substrate and aligned with the through-hole; a circuit pattern portion provided on the body and electrically connected to the circuit pattern on the front surface of the substrate; and a metal portion extending from a bottom surface of the body into the through-hole in a direction toward the metal structure, the metal portion being electrically connected to the circuit pattern portion and the metal structure.

20 Claims, 16 Drawing Sheets

(56) References Cited

U.S. PATENT DOCUMENTS

| | | | | |
|---|---|---|---|---|
| 8,281,497 B2 * | 10/2012 | Takeba | ............ | G02F 1/133604 |
| | | | | 362/225 |
| 8,313,207 B2 * | 11/2012 | Kuromizu | ......... | G02F 1/133608 |
| | | | | 362/97.4 |
| 8,421,958 B2 * | 4/2013 | Zhang | ............... | G02F 1/133608 |
| | | | | 362/97.3 |
| 8,425,070 B2 * | 4/2013 | Shin | ................. | G02F 1/133608 |
| | | | | 362/249.02 |
| 8,459,820 B2 * | 6/2013 | Lee | .................. | G02F 1/133608 |
| | | | | 362/97.3 |
| 8,568,014 B2 | 10/2013 | Kim | | |
| 8,690,371 B2 * | 4/2014 | Takeuchi | .......... | G02F 1/133603 |
| | | | | 362/97.3 |
| 8,797,475 B2 * | 8/2014 | Kuromizu | ........ | G02F 1/133608 |
| | | | | 362/97.3 |
| 9,305,684 B2 | 4/2016 | Kim | | |
| 10,966,320 B2 | 3/2021 | Kim | | |
| 11,112,650 B2 | 9/2021 | Zhu et al. | | |
| 11,487,156 B2 * | 11/2022 | Wang | ................ | G02F 1/133605 |
| 2006/0244891 A1 * | 11/2006 | Tsubokura | ........ | G02F 1/133608 |
| | | | | 349/150 |
| 2009/0279320 A1 * | 11/2009 | Yokota | ................. | F21V 19/008 |
| | | | | 24/570 |
| 2016/0109089 A1 | 4/2016 | Chae et al. | | |

FOREIGN PATENT DOCUMENTS

| | | |
|---|---|---|
| JP | 2021-197356 A | 12/2021 |
| KR | 10-2006-0096886 A | 9/2006 |
| KR | 10-2008-0113901 A | 12/2008 |
| KR | 10-2010-0012848 A | 2/2010 |
| KR | 10-1009280 B1 | 1/2011 |
| KR | 10-2012-0035365 A | 4/2012 |
| KR | 10-1238010 B1 | 3/2013 |
| KR | 10-1249923 B1 | 4/2013 |
| KR | 10-1277489 B1 | 6/2013 |
| KR | 10-2015-0074497 A | 7/2015 |
| KR | 10-2016-0046005 A | 4/2016 |
| KR | 10-2017-0024937 A | 3/2017 |
| KR | 10-2139593 B1 | 7/2020 |
| KR | 10-2020-0117264 A | 10/2020 |

OTHER PUBLICATIONS

Written Opinion (PCT/ISA/237) issued on Jul. 31, 2023 by the International Searching Authority in International Patent Application No. PCT/KR2023/004984.

* cited by examiner

DISPLAY APPARATUS

CROSS-REFERENCE TO RELATED APPLICATIONS

This application is a by-pass continuation of International Application No. PCT/KR2023/004984, filed on Apr. 13, 2023, which is based on and claims priority to Korean Patent Application No. 10-2022-0089210, filed on Jul. 19, 2022, in the Korean Intellectual Property Office, the disclosures of which are incorporated by reference herein in their entireties.

BACKGROUND

1. Field

The disclosure relates to a display apparatus having an improved structure of a supporter mounted on an upper surface of a substrate.

2. Description of Related Art

A display apparatus is an output apparatus that converts obtained or stored electrical information into visual information and displays the visual information to a user. Display apparatuses are used in various fields, such as a home and a business place.

A display apparatus typically includes a monitor apparatus connected to a personal computer or a server computer, a portable computer apparatus, a navigation terminal apparatus, a general television apparatus, an Internet Protocol television (IPTV) apparatus, a portable terminal apparatus such as a smart phone, a tablet PC, a personal digital assistant (PDA) or a cellular phone, various display apparatuses used to reproduce images such as advertisements or movies in an industrial field, or various types of audio/video systems.

A display apparatus includes a light source module to convert electrical information into visual information, and the light source module may include a plurality of light sources that independently emit light.

Each of the plurality of light sources may be, for example, a light-emitting diode (LED) or an organic light-emitting diode (OLED). For example, the LEDs or OLEDs may be mounted on a printed circuit board (PCB) using a surface mount technology (SMT).

Together with the plurality of light sources, a plurality of supporters may be mounted on an upper surface of the printed circuit board to support an optical member disposed in front of the printed circuit board.

SUMMARY

One aspect of one or more embodiments of the disclosure provides a display apparatus improved such that a supporter mounted on an upper surface of a substrate electrically connects a circuit pattern on the upper surface of the substrate to a metal structure at a lower side of the substrate.

According to an aspect of the disclosure, a display apparatus includes: an optical member; a substrate provided at a rear side of the optical member, the substrate including a through-hole and a circuit pattern on a front surface of the substrate; a metal structure provided at a rear side of the substrate; and a supporter provided on the front surface of the substrate, wherein the supporter includes: a body supporting the optical member, the body being provided on the front surface of the substrate and aligned with the through-hole; a circuit pattern portion provided on the body and electrically connected to the circuit pattern on the front surface of the substrate; and a metal portion extending from a bottom surface of the body into the through-hole in a direction toward the metal structure, the metal portion being electrically connected to the circuit pattern portion and the metal structure.

The supporter may be mounted on the front surface of the substrate by a soldered connection and contact the metal structure.

The display apparatus may further include a plurality of supporters including the supporter, the substrate may further include a plurality of through-holes including the through-hole, and each supporter of the plurality of supporters corresponds to a respective through-hole of the plurality of through-holes.

The body may have a conical shape which tapers toward the optical member.

The body may have a pyramid shape which tapers toward the optical member.

The circuit pattern portion may pass through the body and extend parallel to the substrate.

The metal portion may be provided at a center of the bottom surface of the body and have a conical shape which tapers toward the metal structure.

The metal portion may be provided at a center the bottom surface of the body and have a pyramid shape which tapers toward the metal structure.

The metal structure may include a bottom chassis that covers the rear side of the substrate.

The through-hole may have a circular shape, and a diameter of the through-hole may be smaller than a width of the bottom surface of the body and larger than a maximum width of the metal portion.

The through-hole may have a polygonal shape, and a maximum width of the through-hole may be smaller than a width of the bottom surface of the body and larger than a maximum width of the metal portion.

According to an aspect of the disclosure, a display apparatus includes: an optical member; a substrate provided at a rear side of the optical member, the substrate including a plurality of through-holes and a circuit pattern on a front surface of the substrate; a metal structure provided at a rear side of the substrate; and a plurality of supporters provided on the front surface of the substrate, the plurality of supporters supporting the optical member and electrically connect the circuit pattern to the metal structure through the plurality of through-holes.

Each supporter of the plurality of supporters may include: a body provided on the front surface of the substrate and aligned with a corresponding through-hole from among the plurality of through-holes; a circuit pattern portion electrically connected to the circuit pattern; and a metal portion electrically connecting the circuit pattern portion to the metal structure.

The body of each of the plurality of supporters may include a conical shape that tapers toward the optical member.

The circuit pattern portion of each of the plurality of supporters may pass through the body and extend parallel to the substrate.

The metal portion of each of the plurality of supporters may extend from the circuit pattern portion through a corresponding through hole of the plurality of through-holes, and contact the metal structure.

Each through-hole of the plurality of through-holes may have a width that is smaller than a width of a bottom surface of the body of a corresponding supporter of the plurality of supporters and larger than a maximum width of the metal portion of the corresponding supporter.

According to an aspect of the disclosure, a display apparatus includes: an optical member; a substrate provided at a rear side of the optical member, the substrate including a circuit pattern on a front surface of the substrate; a metal structure provided at a rear side of the substrate; and a supporter provided on the front surface of the substrate and supporting the optical member, wherein the supporter includes: a circuit pattern portion electrically connected to the circuit pattern; and a metal portion electrically connecting the circuit pattern portion to the metal structure.

The display apparatus may further include a plurality of supporters including the supporter, the substrate may further include a plurality of through-holes, each supporter of the plurality of supporters may correspond to a respective through-hole of the plurality of through-holes, and the metal portion of each supporter of the plurality of supporters may extend through corresponding through-hole of the plurality of through-holes.

Each supporter of the plurality of supporters may further include a body provided on the front surface of the substrate, and the metal portion of each supporter of the plurality of supporters may extend from a bottom surface of the body in a direction toward the metal structure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
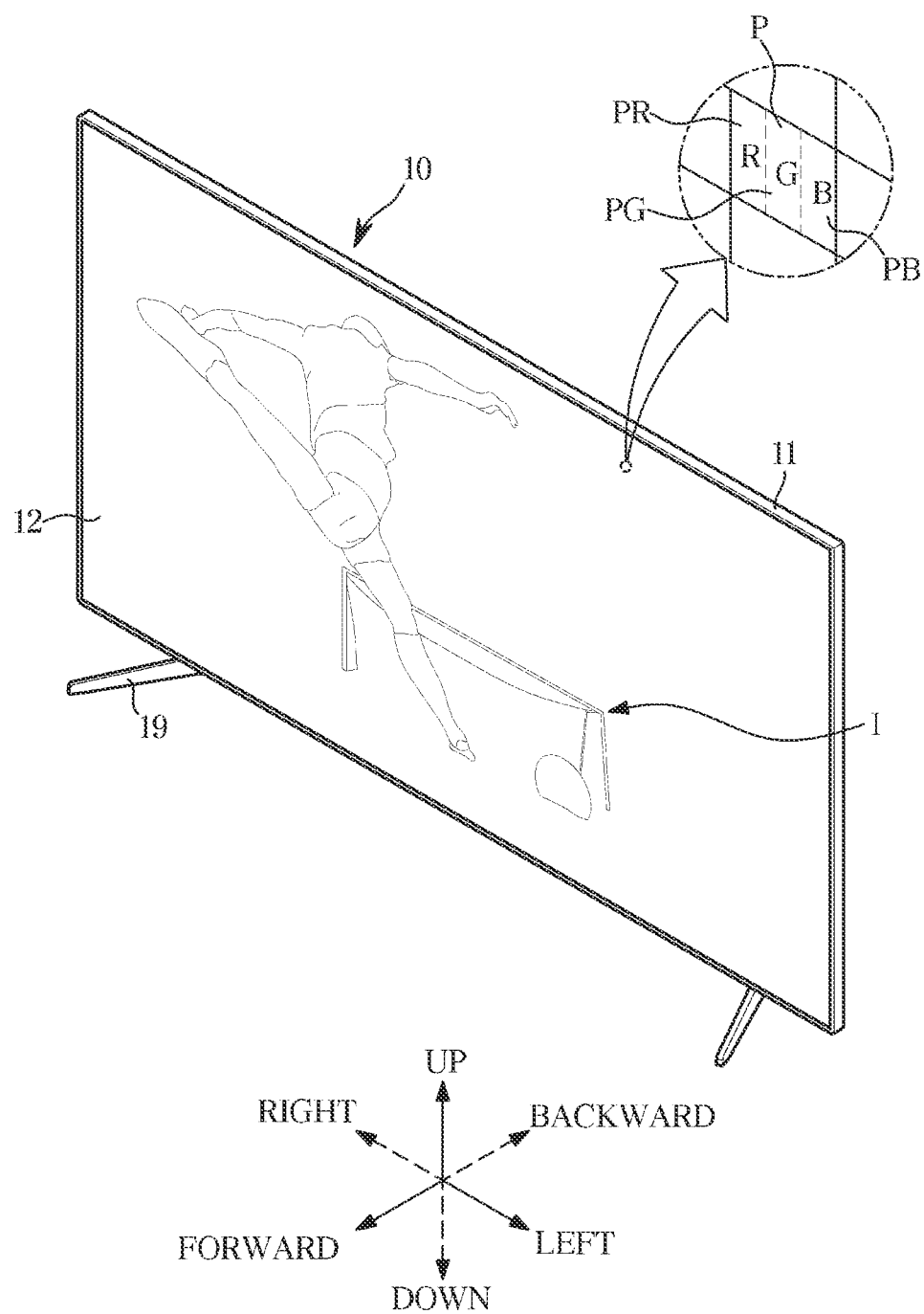
FIG. 1 is a view illustrating an external appearance of a display apparatus according to an embodiment.

Embodiments described in the specification and configurations shown in the accompanying drawings are merely examples of the disclosure, and various modifications may replace the embodiments and the drawings of the disclosure at the time of filing of the application.

Further, identical symbols or numbers in the drawings of the disclosure denote components or elements configured to perform substantially identical functions.

Further, terms used herein are only for the purpose of describing particular embodiments and are not intended to limit the disclosure. The singular form is intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements are not restricted by the terms, and the terms are only used to distinguish one element from another. For example, a first element could be termed a second element, and similarly, a second element could be termed a first element without departing from the scope of the disclosure. The term "and/or" includes combinations of one or all of a plurality of associated listed items. Expressions such as "at least one of," when preceding a list of components, modify the entire list of components and do not modify the individual components of the list. For example, the expression "at least one of a, b or c" indicates only a, only b, only c, both a and b, both a and c, both b and c, or all of a, b, and c.

Terms such as parts, modules, members, and blocks may be implemented using software or hardware, and a plurality of parts, modules, members, and blocks are implemented as a single element, or one part, module, member, or block may in addition include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network.

In addition, when a part "includes" an element, another element may be further included, rather than excluding the existence of another element, unless otherwise described.

Throughout the specification, when a member is referred to as being "on" another member, the member is in contact with another member or yet another member is interposed between the two members.

Hereinafter, embodiments according to the disclosure will be described in detail with reference to the accompanying drawings.

FIG. 1 is a view illustrating an external appearance of a display apparatus according to an embodiment.

A display apparatus 10 is an apparatus that may process an image signal received from the outside and visually display the processed image. Hereinafter, a case in which the display apparatus 10 is a television (TV) is exemplified, but the disclosure is not limited thereto. For example, the display apparatus 10 may be implemented in various forms such as a monitor, a portable multimedia apparatus, and a portable communication apparatus, and the display apparatus 10 is not limited in its form as long as the display apparatus visually displays an image.

In addition, the display apparatus 10 may be a large format display (LFD) installed outdoors, such as on a roof of a building or at a bus stop. Here, the outdoors is not necessarily limited to the exterior of a building, and the display apparatus 10 according to one embodiment may be installed wherever a large number of people may enter and exit, even indoors such as at subway stations, shopping malls, movie theaters, companies, and stores.

The display apparatus 10 may receive content data including video data and audio data from various content sources and output video and audio corresponding to the video data and audio data. For example, the display apparatus 10 may receive content data through a broadcast reception antenna or a wired cable, receive content data from a content playback apparatus, or receive content data from a content-providing server of a content provider.

As shown in FIG. 1, the display apparatus 10 may include a body 11, a screen 12 displaying an image I, and a support 19 provided at a lower side of the body 11 to support the body 11.

The body 11 may form the external appearance of the display apparatus 10, and components configured for the display apparatus 10 to display the image I or perform various functions may be provided inside the body 11. The body 11 shown in FIG. 1 has a flat plate shape, but the shape of the body 11 is not limited to that shown in FIG. 1. For example, the body 11 may have a curved plate shape.

The screen 12 may be formed on a front surface of the body 11 and may display the image I. For example, the screen 12 may display a still image or a video. In addition, the screen 12 may display a two-dimensional plane image or a three-dimensional stereoscopic image using binocular parallax of a user.

A plurality of pixels P may be formed on the screen 12, and the image I displayed on the screen 12 may be formed by light emitted from each of the plurality of pixels P. For example, the image I may be formed on the screen 12 by combining light emitted from the plurality of pixels P like a mosaic.

Each of the plurality of pixels P may emit light of various brightness and color. The screen 12 may include, for example, a self-luminous panel that may emit light by itself (e.g., a light-emitting diode (LED) panel) or a non-self-luminous panel (e.g., a display panel) that may transmit or block light emitted by a light source device or the like.

In order to emit light of various colors, each of the plurality of pixels P may include sub-pixels PR, PG, and PB.

The sub-pixels PR, PG, and PB may include a red sub-pixel PR capable of emitting red light, a green sub-pixel PG capable of emitting green light, and a blue sub-pixel PB capable of emitting blue light. For example, the red light may represent light having a wavelength of approximately 620 nm (nanometers, one billionth of a meter) to 750 nm, the green light may represent light having a wavelength of approximately 495 nm to 570 nm, and the blue light may represent light having a wavelength of approximately 450 nm to 495 nm.

By combining the red light of the red sub-pixel PR, the green light of the green sub-pixel PG, and the blue light of the blue sub-pixel PB, each of the plurality of pixels P may emit light of various brightness and various colors.

Figure 2:
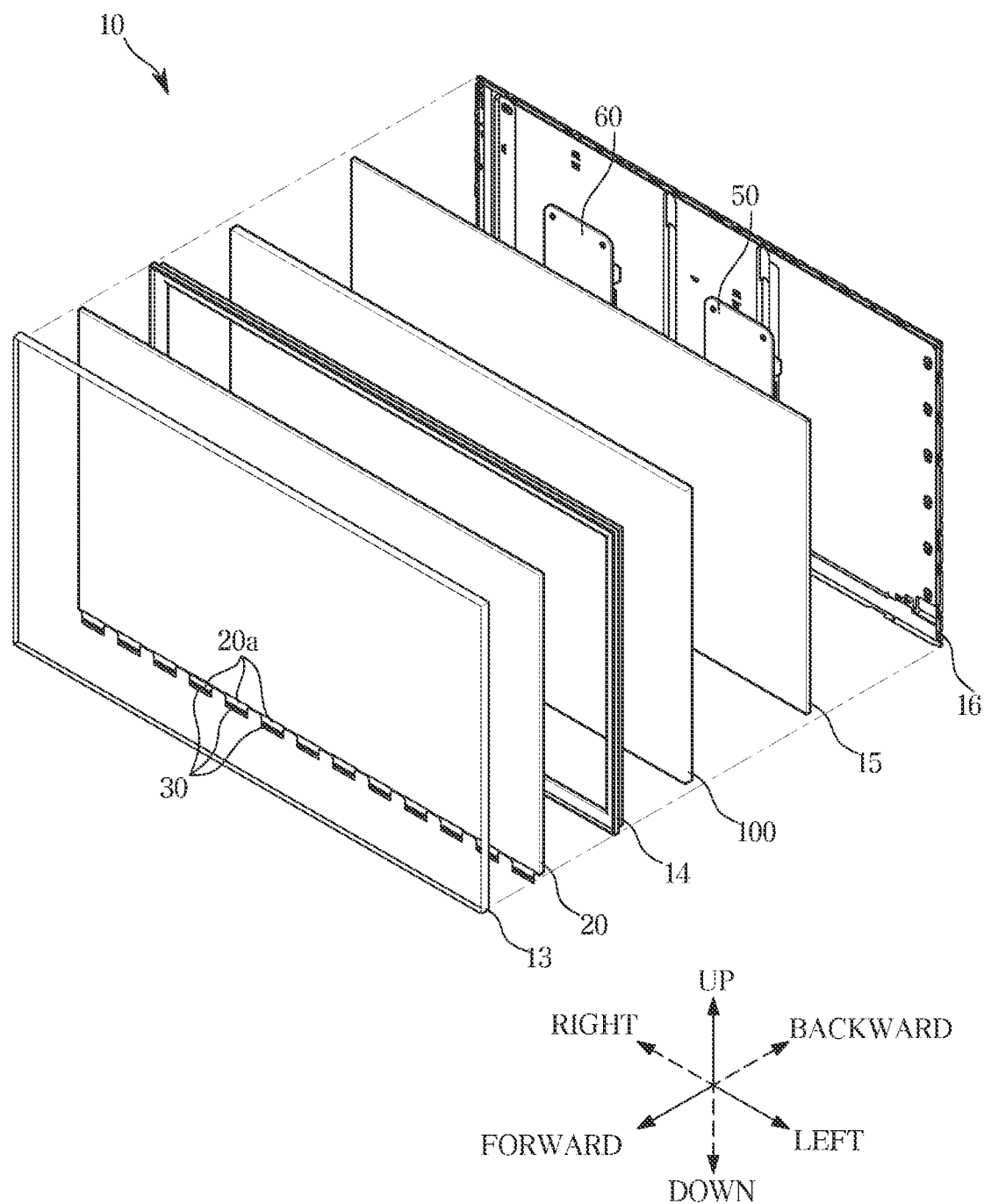
FIG. 2 is an exploded view illustrating the display apparatus shown in FIG. 1.

FIG. 2 is an exploded view illustrating the display apparatus shown in FIG. 1.

As shown in FIG. 2, various components for generating the image I on the screen 12 may be provided in the body 11 of FIG. 1.

For example, the body 11 may include a light source device 100 which is a surface light source, a display panel 20 configured to block or transmit light emitted from the light source device 100, a control assembly 50 configured to control operations of the light source device 100 and the display panel 20, and a power supply assembly 60 configured to supply power to the light source device 100 and the display panel 20. In addition, the body 11 may include a bezel 13, a frame middle mold 14, a bottom chassis 15, and a rear cover 16 for supporting and fixing the display panel 20, the light source device 100, the control assembly and the power supply assembly 60.

Figure 3:
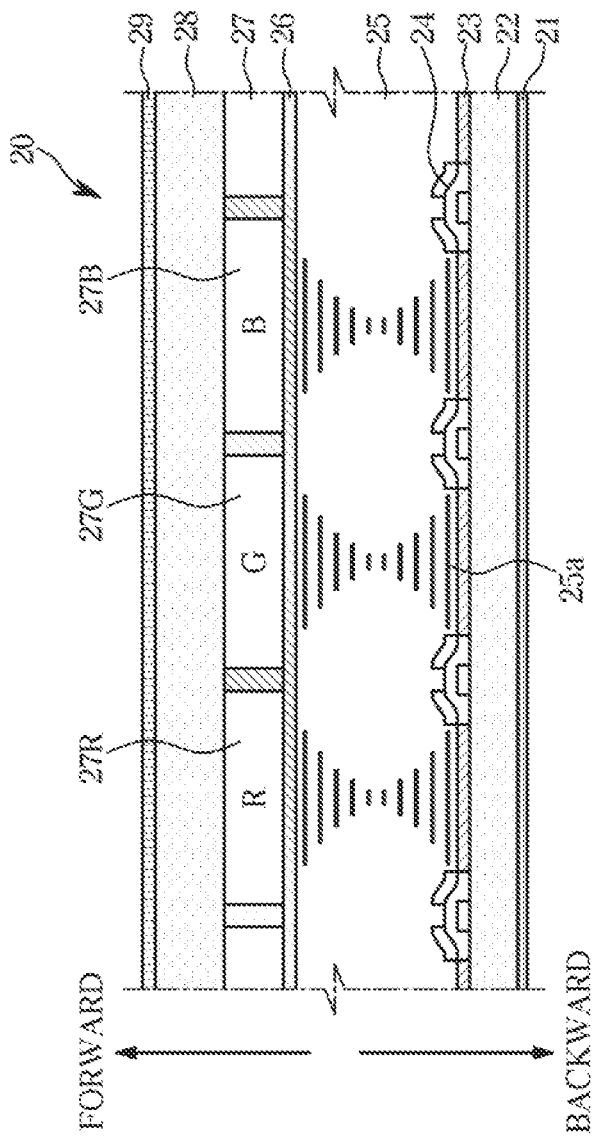
FIG. 3 is a side cross-sectional view illustrating a display panel of the display apparatus shown in FIG. 2.

FIG. 3 is a side, cross-sectional view illustrating a display panel of the display apparatus shown in FIG. 2.

As shown in FIG. 2, the display panel 20 may be provided in front of the light source device 100, and may block or transmit light emitted from the light source device 100 to form the image I.

A front surface of the display panel 20 may form the screen 12 of the display apparatus 10 described above, and the display panel 20 may include the plurality of pixels P. The plurality of pixels P included in the display panel 20 may independently block or transmit the light emitted from the light source device 100, and the light transmitted by the plurality of pixels P may form the image I to be displayed on the screen 12.

For example, as shown in FIG. 3, the display panel 20 may include a first polarizing film 21, a first transparent substrate 22, a pixel electrode 23, a thin-film transistor (TFT) 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin-film transistor 24, the liquid crystal layer 25, the common electrode 26, and the color filter 27. The first and second transparent substrates 22 and 28 may be formed of tempered glass or transparent resin.

The first polarizing film 21 and the second polarizing film 29 may be provided on outer sides of the first and second transparent substrates 22 and 28, respectively.

The first polarizing film 21 and the second polarizing film 29 may each transmit specific polarized light and block the other polarized light. For example, the first polarizing film 21 may transmit light having a magnetic field vibrating in a first direction and block the other light. In addition, the second polarizing film 29 may transmit light having a magnetic field vibrating in a second direction and block the other light. In this case, the first direction and the second direction may be orthogonal to each other. Thus, the light passing through the first polarizing film 21 may not pass through the second polarizing film 29.

The color filter 27 may be provided on an inner side of the second transparent substrate 28.

The color filter 27 may include a red filter 27R configured to transmit red light, a green filter 27G configured to transmit green light, and a blue filter 27B configured to transmit blue light. In addition, the red filter 27R, the green filter 27G, and the blue filter 27B may be disposed parallel to each other. A region in which the color filter 27 is formed may correspond to the pixel P described above. A region in which the red filter 27R is formed may correspond to the red sub-pixel PR, a region in which the green filter 27G is formed may correspond to the green sub-pixel PG, and a region in which the blue filter 27B is formed may correspond to the blue sub-pixel PB.

The pixel electrode 23 may be provided on an inner side of the first transparent substrate 22, and the common electrode 26 may be provided on the inner side of the second transparent substrate 28.

The pixel electrode 23 and the common electrode 26 may be formed of a metal material through which electricity is conducted and may generate an electric field for changing the arrangement of liquid crystal molecules 25a constituting the liquid crystal layer 25 to be described below.

The pixel electrode 23 and the common electrode 26 may be formed of a transparent material and may transmit light incident from the outside. For example, the pixel electrode 23 and the common electrode 26 may include indium tin oxide (ITO), indium zinc oxide (IZO), silver nano wire, carbon nanotube (CNT), graphene, PEDOT (3,4-ethylene-dioxythiophene), or the like.

The thin-film transistor 24 may be provided on the inner side of the first transparent substrate 22.

The thin-film transistor 24 may transmit or block the current flowing through the pixel electrode 23. In addition, by turning the thin-film transistor 24 on (closing) or off (opening), an electric field may be formed or removed from between the pixel electrode 23 and the common electrode 26.

The thin film transistor 24 may be formed of poly-silicon and may be formed by a semiconductor process, such as lithography, deposition, ion implantation, and the like.

The liquid crystal layer 25 may be formed between the pixel electrode 23 and the common electrode 26 and may be filled with the liquid crystal molecules 25a.

The liquid crystal represents an intermediate state between a solid (crystal) and a liquid. Most of the liquid crystal substances are organic compounds, where the molecular shape is long and thin, and the arrangement of molecules may include an irregular state in one direction, but may have a regular crystal form in another direction. As a result, the liquid crystal may have both liquid fluidity and crystal (solid) optical anisotropy.

The liquid crystal may exhibit optical properties depending on a change of the electric field. For example, an arrangement direction of the molecules constituting the liquid crystal may change depending on the change of the electric field. When an electric field is generated in the liquid crystal layer 25, the liquid crystal molecules 25a of the liquid crystal layer 25 may be arranged according to the direction of the electric field, and when the electric field is not generated in the liquid crystal layer 25, the liquid crystal molecules 25a may be irregularly arranged or may be arranged along an alignment layer (not shown). As a result, optical properties of the liquid crystal layer 25 may change according to the presence or absence of the electric field passing through the liquid crystal layer 25.

A cable 20a through which image data is transmitted to the display panel 20 and a display driver integrated circuit (DDI) 30 (hereinafter, referred to as the "driver IC") configured to process digital image data and output an analog image signal are provided on one side of the display panel 20.

The cable 20a may electrically connect between the control assembly 50/power supply assembly 60 and the driver IC 30 and may also electrically connect between the driver IC 30 and the display panel 20. The cable 20a may include a flexible flat cable, a film cable, or the like that may be bendable.

The driver IC 30 may receive image data and power from the control assembly 50/the power supply assembly 60 through the cable 20a. Further, the driver IC 30 may provide image data and driving current to the display panel 20 through the cable 20a.

Further, the cable 20a and the driver IC 30 may be integrally implemented as a film cable, a chip on film (COF), a tape carrier package (TCP), or the like. In other words, the driver IC 30 may be disposed on the cable 20a. However, the disclosure is not limited thereto, and the driver IC 30 may be disposed on the display panel 20.

The control assembly 50 may include a control circuit configured to control operations of the display panel 20 and the light source device 100. The control circuit may process image data received from an external content source, transmit the image data to the display panel 20, and transmit dimming data to the light source device 100.

The power supply assembly 60 may supply power to the display panel 20 and the light source device 100 such that the light source device 100 outputs surface light and the display panel 20 blocks or transmits the light of the light source device 100.

The control assembly 50 and the power supply assembly 60 may be implemented with a board and various circuits mounted on the board. For example, the power supply circuit may include a condenser, a coil, a resistance element, a processor, and the like and a power supply circuit board on which these elements are mounted. In addition, the control circuit may include a memory, a processor, and a control circuit board on which these elements are mounted.

Figure 4:
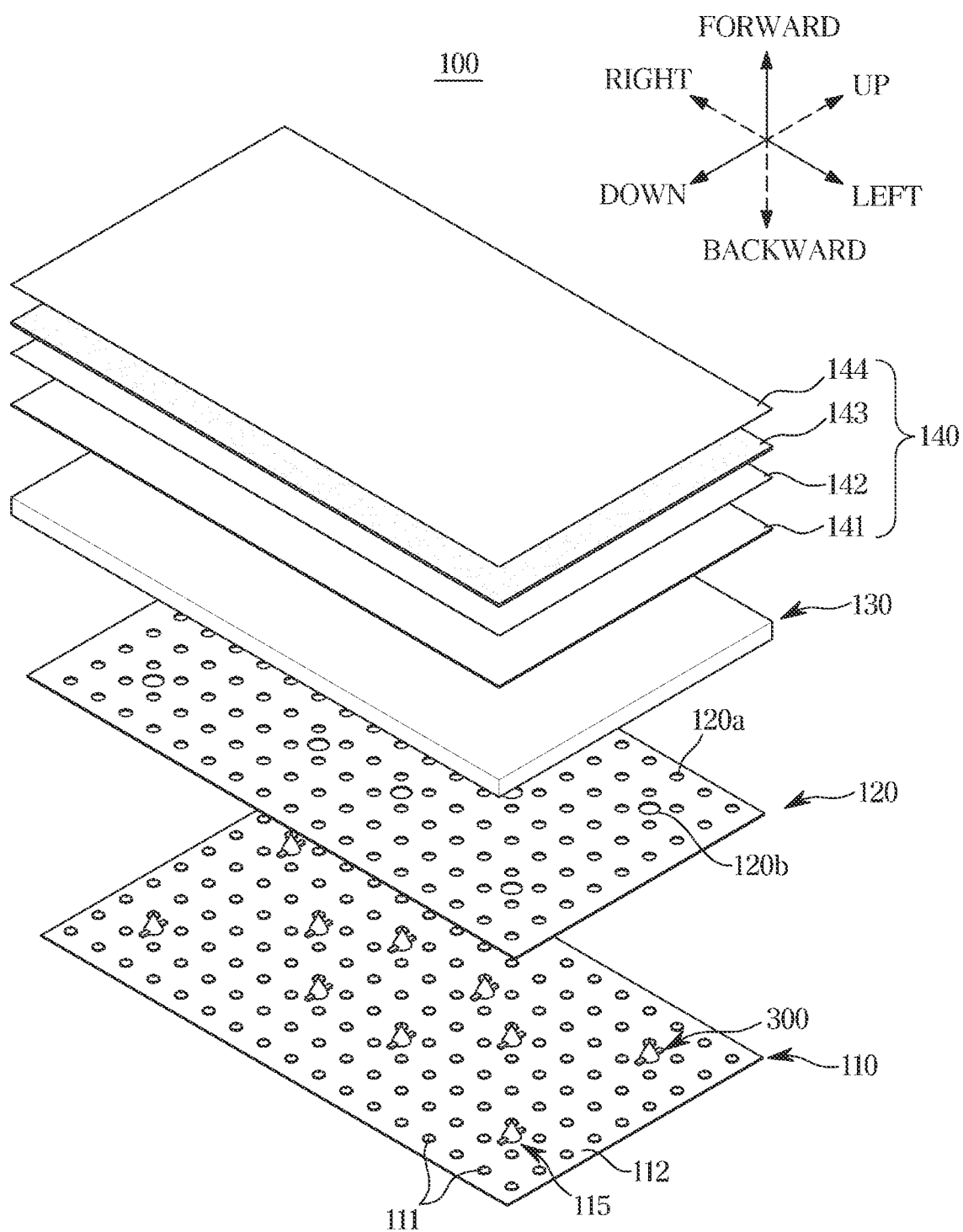
FIG. 4 is an exploded view illustrating a light source device shown in FIG. 2.
Figure 5:
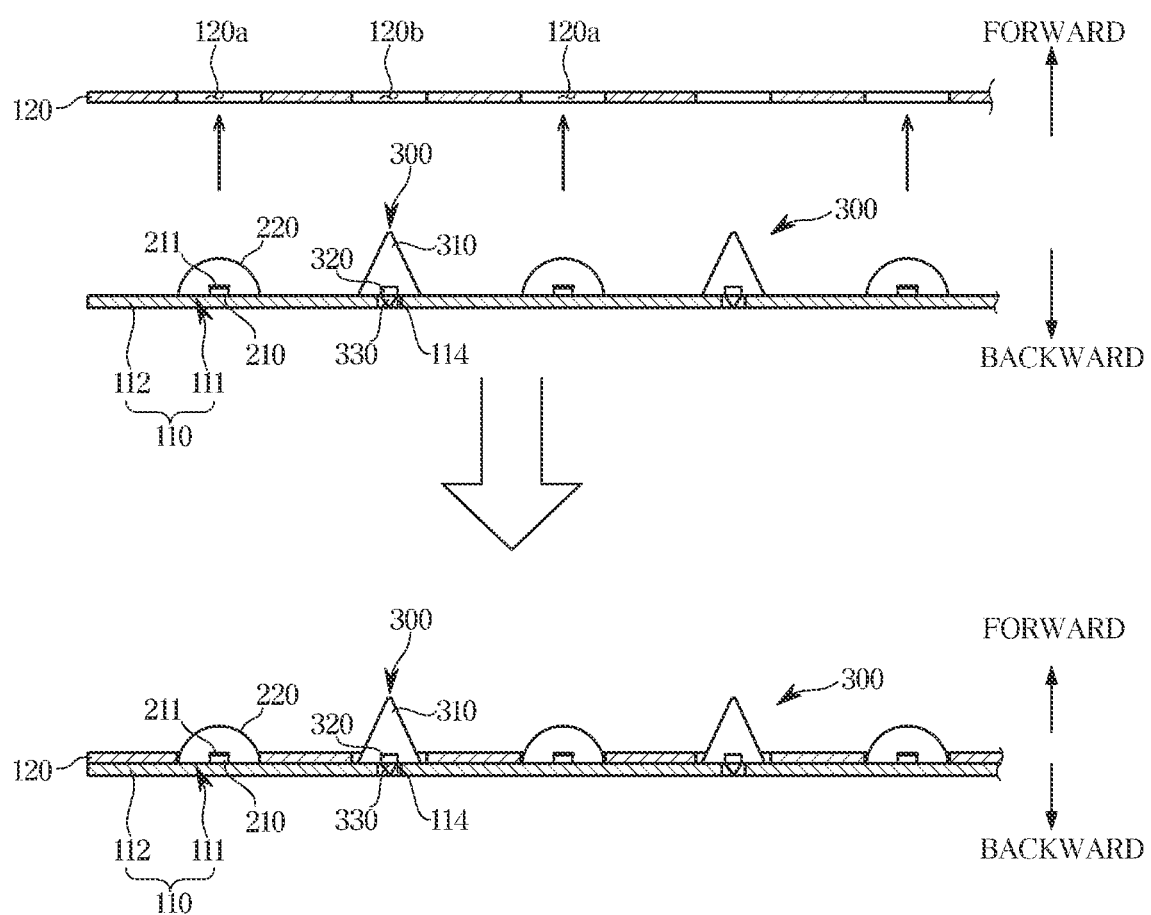
FIG. 5 is a view illustrating a process of coupling a light source module and a reflective sheet included in the light source device shown in FIG. 4.

FIG. 4 is an exploded view illustrating a light source device shown in FIG. 2. FIG. 5 is a view illustrating a process of coupling a light source module and a reflective sheet included in the light source device shown in FIG. 4.

The light source device 100 may include a point light source that emits monochromatic light or white light, and may refract, reflect, and scatter the light to convert the light emitted from the point light source into a uniform surface light. For example, the light source device 100 may include a plurality of light sources 111 configured to emit the monochromatic light or white light, a diffuser plate 130 configured to diffuse the light incident from the plurality of light sources 111, a reflective sheet 120 configured to reflect the light emitted from a rear surface of the diffuser plate 130 and the plurality of light sources 111, and an optical sheet 140 configured to refract and scatter the light emitted from a front surface of the diffuser plate 130.

As such, the light source device 100 may emit a uniform surface light toward the front by refracting, reflecting, and scattering the light emitted from the light source.

The light source device 100 may include a light source module 110 configured to generate light, a reflective sheet 120 configured to reflect the light, a diffuser plate 130 configured to uniformly diffuse the light, and an optical sheet 140 configured to improve brightness of the emitted light. The diffuser plate 130 and the optical sheet 140 may be referred to as optical members 130 and 140.

The light source module 110 may be disposed behind the display panel 20. The light source module 110 may include a plurality of light sources 111 configured to emit light and a substrate 112 configured to support/fix the plurality of light sources 111.

The plurality of light sources 111 may be disposed in a predetermined pattern such that light is emitted with uniform brightness. The plurality of light sources 111 may be disposed such that intervals between one light source and light sources adjacent thereto are the same.

For example, as shown in FIG. 4, the plurality of light sources 111 may be arranged in rows and columns. Accordingly, the plurality of light sources may be disposed such that an approximate square is formed by four adjacent light sources. In addition, any one light source may be disposed adjacent to four light sources, and the distances between the one light source and each of the four adjacent light sources may be approximately the same.

Alternatively, the plurality of light sources may be disposed in a plurality of rows, and a light source belonging to each row may be disposed at the center between two light sources belonging to adjacent rows. Accordingly, the plurality of light sources may be disposed such that an approximately equilateral triangle may be formed by three adjacent light sources. In this case, one light source may be disposed adjacent to six light sources, and the distances between the one light source and the six light sources adjacent thereto may be approximately the same.

However, the pattern in which the plurality of light sources 111 are disposed is not limited to the above-described pattern, and the plurality of light sources 111 may be disposed in various patterns such that light may be emitted with uniform luminance.

The light sources 111 may employ an element configured to emit monochromatic light (light having a specific range of wavelengths of light, for example, blue light) or white light (i.e., mixed light of red light, green light, and blue light) in various directions when power is supplied. For example, the light source 111 may include an LED.

The substrate 112 may fix the plurality of light sources 111 to prevent the positions of the light sources 111 from being changed. In addition, the substrate 112 may supply each light source 111 with power such that the light source 111 emits light. The substrate 112 may be disposed behind the optical members 130 and 140.

The substrate 112 may fix the plurality of light sources 111, and may be formed of a synthetic resin, tempered glass, or a printed circuit board (PCB) on which a conductive power supply line for supplying power to the light source 111 is formed.

The supporter 300 may be installed on the substrate 112. The supporter 300 may be mounted on the upper surface of the substrate 112 by soldering. The supporter 300 may be provided in plural. The plurality of supporters 300 may be disposed between the substrate 112 and the optical members 130 and 140. The plurality of supporters 300 may be mounted on the upper surface of the substrate 112 to support the optical members 130 and 140.

The supporter 300 may be provided to maintain an optical distance (OD) between the light source 111 and the diffuser plate 130 and/or the optical sheet 140, thereby maintaining optical characteristics of the light source device 100. The supporter 300 may be provided with a length for maintaining the optical characteristics of the light source device 100. Details of the supporter 300 will be described below.

The reflective sheet 120 may allow light emitted from the plurality of light sources 111 to be reflected forward or in a direction close to the forward direction.

The reflective sheet 120 may be formed with a plurality of light source through-holes 120*a* at positions corresponding respectively to the plurality of light sources 111 of the light source module 110. In addition, the light sources 111 of the light source module 110 may protrude forward of the reflective sheet 120 by passing through the light source through-holes 120*a*.

For example, as shown in the upper side of FIG. 5, in a process of assembling the reflective sheet 120 and the light source module 110, the plurality of light sources 111 of the light source module 110 are inserted into the light source through-holes 120*a* formed in the reflective sheet 120. Therefore, as shown in the lower side of FIG. 5, the substrate 112 of the light source module 110 may be located behind the reflective sheet 120, but the plurality of light sources 111 of the light source module 110 may be located in front of the reflective sheet 120.

Accordingly, the plurality of light sources 111 may emit light at the front of the reflective sheet 120.

The reflective sheet 120 may be formed with a plurality of supporter holes 120*b* at positions corresponding to the supporters 300. The supporters 300 may protrude by passing through the supporter holes 120*b* to support the diffuser plate 130 and/or the optical sheet 140. The supporters 300 may be located on the supporter holes 120*b*.

The plurality of light sources 111 may emit light in various directions from the front of the reflective sheet 120. Light may not only be emitted from the light source 111 toward the diffuser plate 130, but may also be emitted from the light source 111 toward the reflective sheet 120, and the reflective sheet 120 may allow light emitted toward the reflective sheet 120 to be reflected toward the diffuser plate 130.

Light emitted from the light source 111 may pass through various objects, such as the diffuser plate 130 and the optical sheet 140. When light passes through the diffuser plate 130 and the optical sheet 140, a part of the incident light may be reflected from the surfaces of the diffuser plate 130 and the optical sheet 140. The reflective sheet 120 may reflect the light having been reflected by the diffuser plate 130 and the optical sheet 140.

The diffuser plate 130 may be provided in front of the light source module 110 and the reflective sheet 120, and evenly disperse the light emitted from the light sources 111 of the light source module 110.

As described above, the plurality of light sources 111 may be located at various places on the rear surface of the light source device 100. Although the plurality of light sources 111 are arranged at equal intervals on the rear surface of the light source device 100, unevenness in luminance may occur depending on the positions of the plurality of light sources 111.

The diffuser plate 130 may diffuse light emitted from the plurality of light sources 111 within the diffuser plate 130 in order to remove unevenness in luminance due to the plurality of light sources 111. In other words, the diffuser plate 130 may allow the non-uniform light emitted from the plurality of light sources 111 to be uniformly emitted forward.

The optical sheet 140 may include various sheets for improving luminance and uniformity of luminance. For example, the optical sheet 140 may include at least one of a diffusion sheet 141, a first prism sheet 142, a second prism sheet 143, and a reflective polarizing sheet 144.

The diffusion sheet 141 may diffuse light for uniformity in luminance. Light emitted from the light sources 111 may be diffused by the diffuser plate 130 and again diffused by the diffusion sheet 141 included in the optical sheet 140.

The first and second prism sheets 142 and 143 may increase luminance by condensing the light diffused by the diffusion sheet 141. The first and second prism sheets 142 and 143 may each include a triangular prism-shaped prism pattern, and a plurality of the prism patterns may be arranged adjacent to each other, forming a shape of a plurality of bands.

The reflective polarizing sheet 144 is a type of a polarizing film, and may transmit a part of the incident light and reflect the other part of the incident light, to improve luminance. For example, the reflective polarizing sheet 144 may transmit polarized light in the same direction as a predetermined polarization direction of the reflective polarizing sheet 144 and reflect polarized light in a direction different from the polarization direction of the reflective polarizing sheet 144. In addition, the light reflected by the reflective polarizing sheet 144 may be recycled inside the light source device, and the light recycle may allow the luminance of the display apparatus 10 to be improved.

The optical sheet 140 is not limited to the sheet or film shown in FIG. 4 and may include more various sheets or films, such as a protective sheet.

Figure 6:
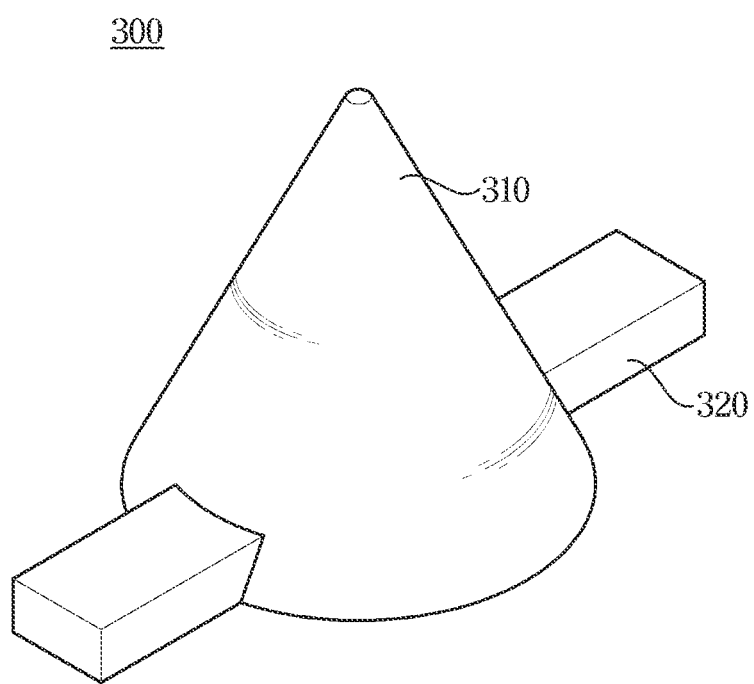
FIG. 6 is a top, perspective view illustrating a supporter according to an embodiment.
Figure 7:
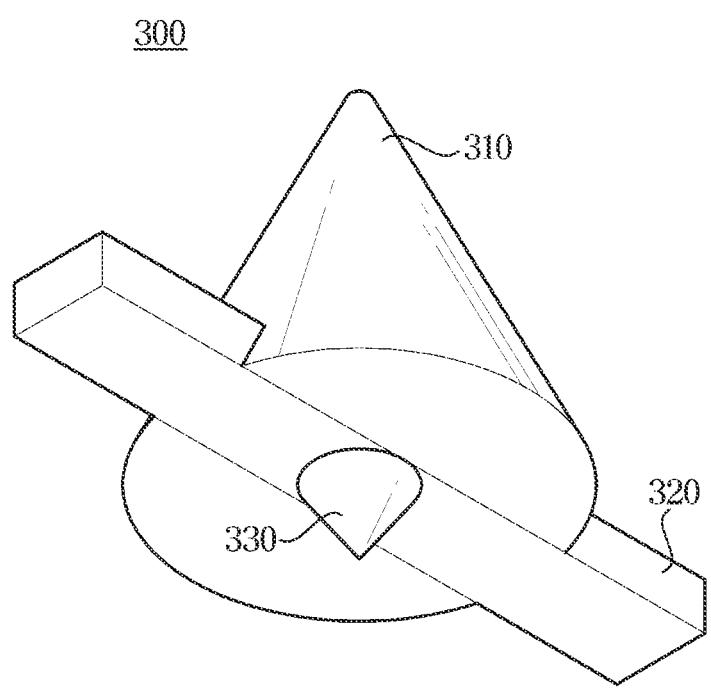
FIG. 7 is a bottom, perspective view illustrating the supporter shown in FIG. 6.
Figure 8:
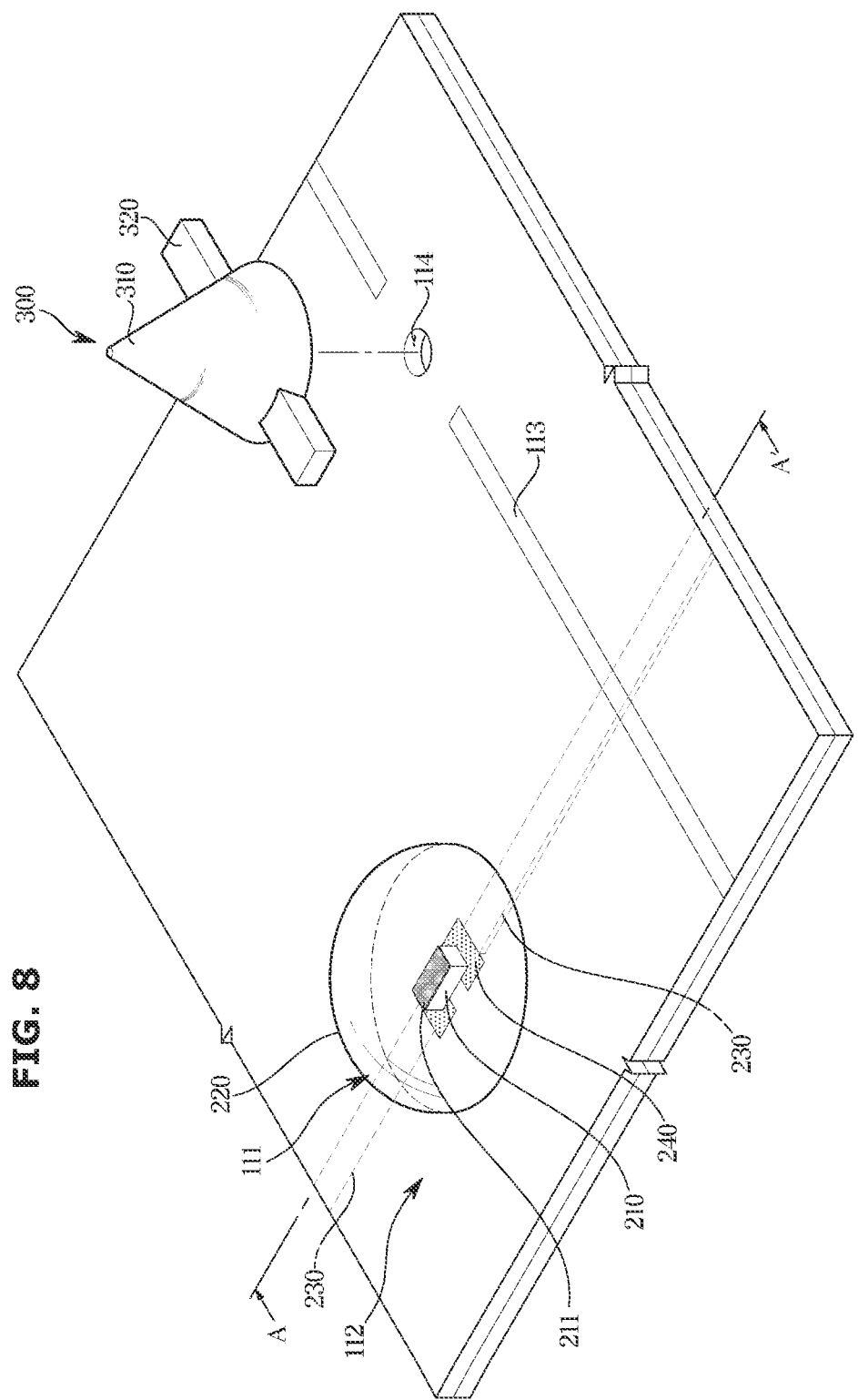
FIG. 8 is an enlarged view illustrating a light source and a supporter mounted on a substrate shown in FIG. 4.
Figure 9:
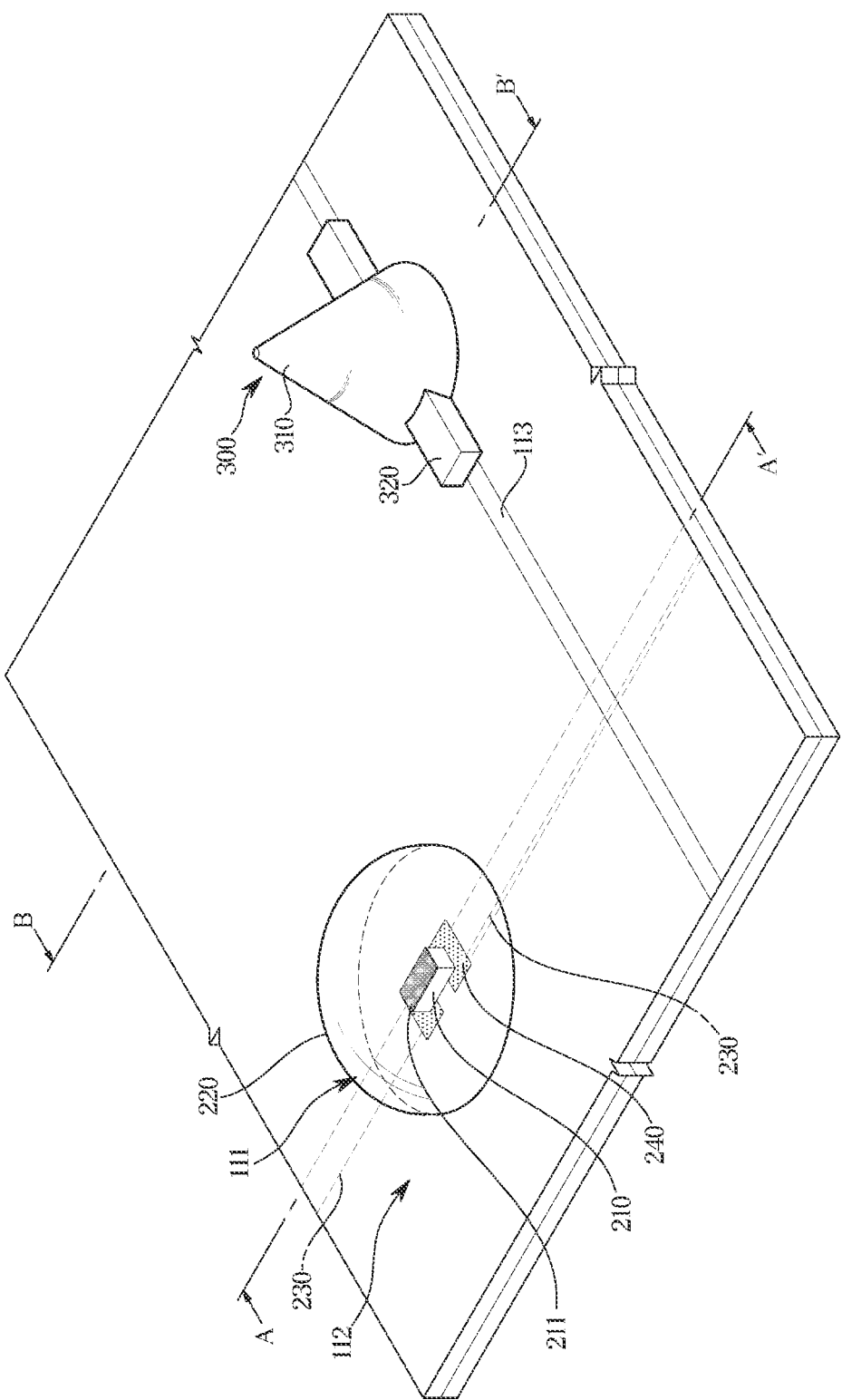
FIG. 9 is a view illustrating a state in which the supporter shown in FIG. 8 is mounted on the substrate.
Figure 10:
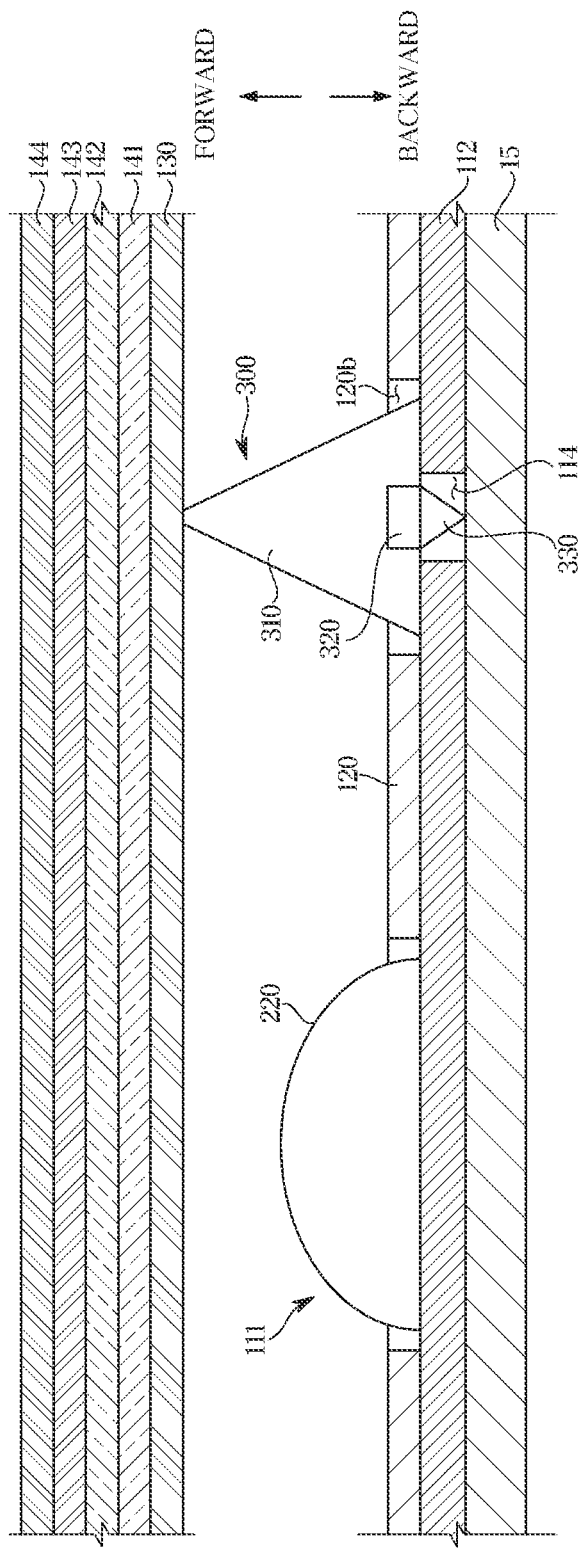
FIG. 10 is a cross-sectional view taken along line B-B' shown in FIG. 9, which schematically shows a state in which a body of the supporter mounted on the upper surface of the substrate supports an optical member and a metal portion of the supporter is in contact with a metal structure.
Figure 11:
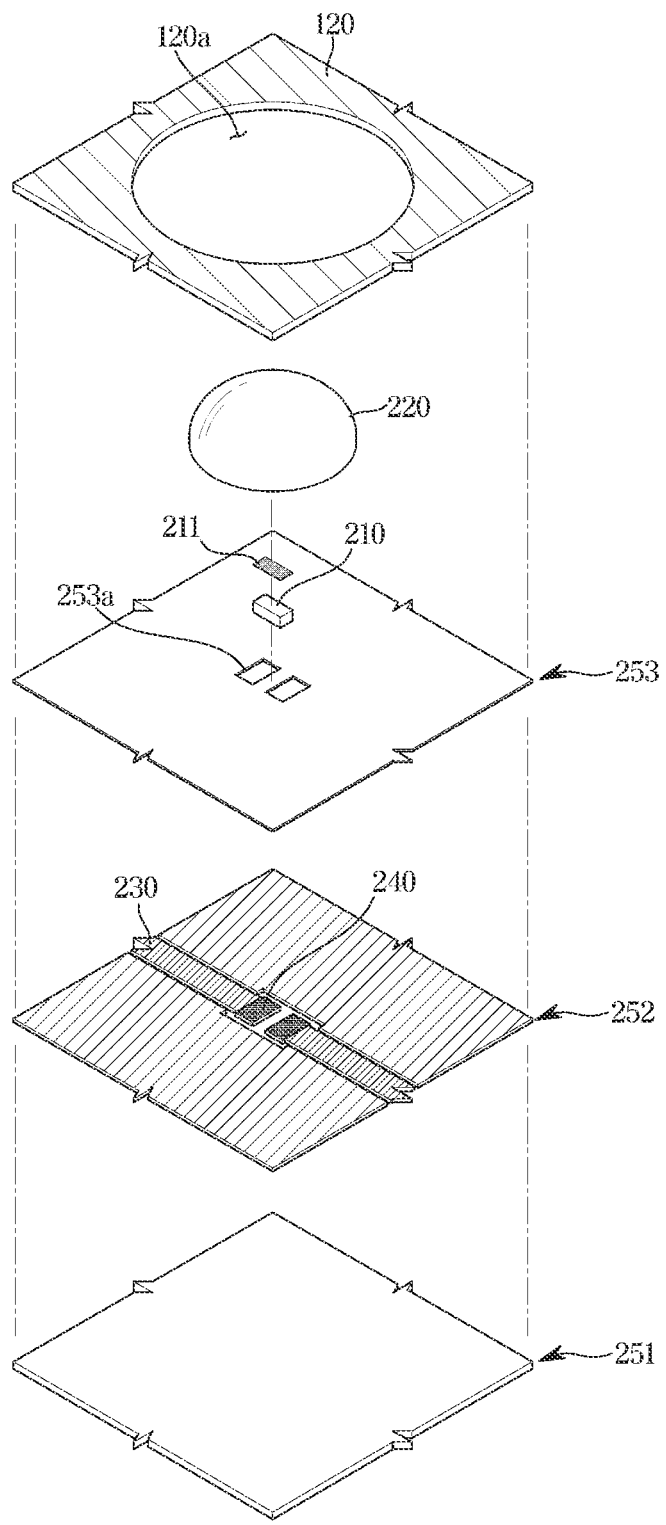
FIG. 11 is an exploded view illustrating the light source shown in FIG. 8.
Figure 12:
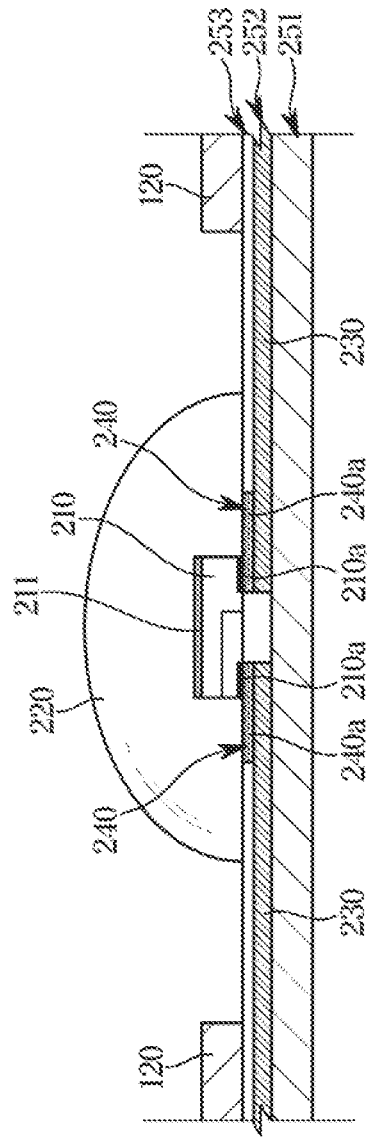
FIG. 12 is a cross-sectional view taken along line A-A" shown in FIG. 8.

FIG. 6 is a view illustrating a supporter according to an embodiment. FIG. 7 is a view illustrating the supporter shown in FIG. 6 when viewed in a different direction. FIG. 8 is an enlarged view illustrating a light source and a supporter mounted on a substrate shown in FIG. 4. FIG. 9 is a view illustrating a state in which the supporter shown in FIG. 8 is mounted on the substrate. FIG. 10 is a cross sectional view taken along line B-B' shown in FIG. 9, which schematically shows a state in which a body of the supporter mounted on the upper surface of the substrate supports an optical member and a metal portion of the supporter is in contact with a metal structure. FIG. 11 is an exploded view illustrating the light source shown in FIG. 8.

As shown in FIGS. 6 to 12, the supporter 300 may include a body 310 mounted on the upper surface of the substrate 112. The supporter 300 may include a circuit pattern portion 320 electrically connected to the circuit pattern 113 on the upper surface of the substrate 112. The supporter 300 may include a metal portion 330 electrically connecting the circuit pattern portion 320 to the bottom chassis 15 (see FIG. 2), which is a metal structure that covers the rear of the substrate 112.

The body 310 may be mounted on the upper surface of the substrate 112. The body 310 may be mounted on the upper side of a through-hole 114 formed in the substrate 112 on the upper surface of the substrate 112. Through-holes 114 may be provided in the substrate 112 to correspond in number to the number of the supporters 300 provided in plural. The body 310 mounted on the upper surface of the substrate 112 may support the optical members 130 and 140 (see, e.g., FIG. 4).

The body 310 may be formed such that a bottom surface 311 has a circular shape. The body 310 may be formed in a conical shape with a diameter gradually decreasing in an upward direction, which is a direction toward the optical members 130 and 140, from the bottom surface 311. Although the bottom surface 311 is illustrated as having a circular shape on the drawings, it is not limited thereto. That is, the bottom surface 311 of the body 310 may be formed in various shapes other than a circular shape.

The circuit pattern portion 320 may be provided on the body 310. The circuit pattern portion 320 may be provided in the lower end portion of the body 310. The circuit pattern portion 320 may be provided in the lower end portion of the body 310 in parallel with the substrate 112 while passing through the body 310. The circuit pattern portion 320 may be electrically connected to the circuit pattern 113 on the upper surface of the substrate 112. However, the circuit pattern portion 320 does not need to pass through the body 310. For example, the circuit pattern portion 320 may be provided to connect the circuit pattern 113 on the upper surface of the substrate 112 to the metal portion 330 without passing through the body 310. That is, when the metal portion 330 is provided in the center of the bottom surface 311 of the body 310, the circuit pattern portion 320 may be formed up to the center of the body 310 to connect the circuit pattern 113 and the metal portion 330 to each other.

The metal portion 330 may be formed to protrude from the lower portion of the body 310 in a direction toward the bottom chassis 15, which is a metal structure. The metal portion 330 may be formed in the center of the bottom surface 311 of the body 310. The metal portion 330 provided in the center of the body 310 may have an upper surface that is formed in a circular shape. The upper surface of the metal portion 330 may be a surface in contact with the circuit pattern portion 320. The metal portion 330 may be formed in a conical shape with a diameter gradually decreasing in a direction from the circular upper surface toward the bottom chassis 15, which is a metal structure.

In a state in which the body 310 is mounted on the upper side of the through-hole 114 on the upper surface of the substrate 112, the metal portion 330 may be in contact with the bottom chassis 15, which is a metal structure, by passing through the through-hole 114. That is, as the metal portion 330 is grounded with the bottom chassis 15, which is a metal structure, by passing through the through-hole 114, the metal portion 330 may be electrically connected to the bottom chassis 15. The supporter 300 may be mounted on the upper surface of the substrate 112 by soldering in a state in which the metal portion 330 is inserted into the through-hole 114 so as to contact the bottom chassis 15, which is a metal structure.

The supporter 300 may allow the circuit pattern 113 on the upper surface of the substrate 112 to be electrically connected to the bottom chassis 15, which is a metal structure on the lower side of the substrate 112, thereby improving the complexity of the circuit pattern 113 printed on the upper surface of the substrate 112. That is, circuit design of the substrate 112 may be simplified by the supporter 300.

In addition, since the circuit pattern 113 on the upper surface of the substrate 112 is electrically connected to the bottom chassis 15, which is a metal structure on the lower side of the substrate 112, by the supporter 300, the number of circuit patterns 113 connected by via holes or jumpers formed in the substrate 112 may be reduced, and thus the number of processes or parts required for manufacturing the substrate 112 may be reduced.

In addition, since the circuit pattern 113 on the upper surface of the substrate 112 is electrically connected to the bottom chassis 15, which is a metal structure on the lower side of the substrate 112, by the supporter 300, the connection length of electrically connecting the circuit pattern 113 on the upper surface of the substrate 112 to the bottom chassis 15, which is a metal structure on the lower side of the substrate 112, may be shortened, thereby improving stability.

In addition, since the circuit pattern 113 on the upper surface of the substrate 112 is directly connected to the bottom chassis 15, which is a metal structure on the lower side of the substrate 112, by the supporter 300, electrostatic discharge may be prevented and circuit elements may be protected.

The through-hole 114 may be formed in the substrate 112 to allow the metal portion 330 to pass therethrough and then come into contact with the bottom chassis 15, which is a metal structure. The through-holes 114 may be provided corresponding in number to the number of supporters 300 provided in plural. The through-hole 114 may have a size smaller than the area of the bottom surface 311 of the body 310 such that the supporter 300 may be mounted on the upper side of the through-hole 114. That is, the through-hole 114 may be formed to have a size in which the body 310 is prevented from being inserted into the through-hole 114 when the supporter 300 is mounted on the upper surface of the substrate 112.

The through-hole 114 may be formed in a circular shape having a size larger than that of the metal portion 330 such that the metal portion 330 may pass therethrough. Although the through-hole 114 is shown as being formed in a circular shape on the drawings, it is not limited thereto. That is, the through-hole 114 may be formed to have various shapes as long as it allow the metal portion 330 to pass therethrough and come into contact with the bottom chassis 15, which is a metal structure.

As described above, the light source module 110 may include a plurality of light sources 111. The plurality of light sources 111 may pass through the light source through-holes 120a at the rear of the reflective sheet 120 and protrude forward of the reflective sheet 120. Accordingly, portions of the light sources 111 and the substrate 112 may be exposed to the front of the reflective sheet 120 through the light source through-holes 120a.

The light source 111 may include an electrical/mechanical structure positioned in an area defined by the light source through-hole 120a of the reflective sheet 120.

Each of the plurality of light sources 111 may include a LED 210, an optical dome 220, and a reflective layer 211.

The LED 210 may include an n-type semiconductor layer and a p-type semiconductor layer to emit light by recombination of holes and electrons. Further, the LED 210 may be provided with a pair of electrodes 210a configured to supply holes and electrons to the P-type semiconductor and the N-type semiconductor, respectively.

The LED 210 may convert electrical energy to optical energy. In other words, the LED 210 may emit light having the maximum intensity at a predetermined wavelength of supplied power. For example, the LED 210 may emit blue light having a peak value at a wavelength which represents a blue color (e.g., a wavelength between 430 nm to 495 nm).

The LED 210 may be directly attached to the substrate 112 in a chip on board (COB) manner. In other words, the light source 111 may include the LED 210 in which a LED chip or a LED die is directly attached to the substrate 112 without separate packaging.

In order to miniaturize the light source 111, the light source module 110 in which a flip-chip type LED 210 is attached to the substrate 112 in the chip on board manner may be manufactured.

A feeding line 230 and a feeding pad 240 may be provided on the substrate 112 to supply power to the LED 210 provided in a flip chip type.

The feeding line 230 may be provided on the substrate 112 to supply electrical signals and/or power from the control assembly 50 and/or the power supply assembly 60 to the LED 210.

The substrate 112 may be formed by alternately stacking a non-conductive insulation layer 251 and a conduction layer 252.

A line or pattern through which power and/or an electrical signal passes may be formed in the conduction layer 252. The conduction layer 252 may be formed of various materials having electrical conductivity. For example, the conduction layer 252 may be formed of various metal materials, such as copper (Cu), tin (Sn), aluminum (Al), an alloy thereof, and the like.

A dielectric of the insulation layer 251 may insulate between the lines or patterns of the conduction layer 252. The insulation layer 251 may be formed of a dielectric for electrical insulation, for example, FR-4.

The feeding line 230 may be implemented by the line or pattern formed in the conduction layer 252.

The feeding line 230 may be electrically connected to the LED 210 through feeding pads 240.

The feeding pads 240 may be formed by exposing the feeding line 230 to the outside.

A protection layer 253 configured to prevent or suppress damage due to an external impact, damage due to a chemical action (for example, corrosion or the like), and/or damage due to an optical action may be formed on the outermost side of the substrate 112. The protection layer 253 may include a photo solder resist (PSR).

The protection layer 253 may cover the feeding line 230 to prevent the feeding line 230 from being exposed to the outside.

The protective layer 253 may have a window that expose a portion of the feeding line 230 to the outside for electrical contact between the feeding line 230 and the LED 210. The portion of the feeding line 230 exposed to the outside by the window of the protection layer 253 may form the feeding pad 240.

The feeding pads 240 may be coated with a conductive adhesive material 240a for electrical contact between the feeding line 230 exposed to the outside and the electrodes 210a of the LED 210. The conductive adhesive material 240a may be applied to the inside of the window of the protection layer 253.

The electrodes 210a of the LED 210 may come into contact with the conductive adhesive material 240a, and the LED 210 may be electrically connected to the feeding line 230 through the conductive adhesive material 240a.

The conductive adhesive material 240a may include, for example, solder having electrical conductivity. However, the disclosure is not limited thereto, and the conductive adhesive material 240a may include electrically conductive epoxy adhesives having an electrical conductivity.

Power may be supplied to the LED 210 through the feeding line 230 and the feeding pads 240, and when the power is supplied, the light-emitting diode 210 may emit light. A pair of feed pads 240 corresponding respectively to a pair of electrodes 210a provided in the flip-chip type LED 210 may be provided.

The optical dome 220 may cover the LED 210. The optical dome 220 may prevent or suppress damages to the LED 210 caused by an external mechanical action and/or damage to the LED 210 caused by a chemical action.

The optical dome 220 may have a dome shape formed in such a way that a sphere is cut into a surface not including the center thereof, or may have a hemispherical shape in such a way that a sphere is cut into a surface including the center thereof. A vertical cross section of the optical dome 220 may be an arc shape or a semicircle shape.

The optical dome 220 may be formed of silicone or epoxy resin. For example, the molten silicon or epoxy resin may be discharged onto the LED 210 through a nozzle, and the discharged silicon or epoxy resin may be cured, thereby forming the optical dome 220.

Accordingly, the shape of the optical dome 220 may vary depending on the viscosity of the liquid silicone or epoxy resin. For example, in a state in which the optical dome 220 is manufactured using silicon having a thixotropic index of about 2.7 to 3.3 (appropriately, 3.0), the optical dome 220 may include a dome ratio, indicating a ratio of a height of a dome to a diameter of a base of the dome (the height of the dome/diameter of the base), of approximately 0.25 to 0.31 (appropriately 0.28). For example, the optical dome 220 formed of silicon having a thixotropic index of about 2.7 to 3.3 (appropriately 3.0) may have a diameter of a base of about 2.5 mm and a height of about 0.7 mm.

The optical dome 220 may be optically transparent or translucent. Light emitted from the LED 210 may be emitted to the outside by passing through the optical dome 220.

In this case, the dome-shaped optical dome 220 may refract light like a lens. For example, light emitted from the LED 210 may be refracted by the optical dome 220 and thus dispersed.

As described above, the optical dome 220 may protect the LED 210 from an external mechanical action, chemical action, or electrical action, as well as dispersing light emitted from the LED 210. The reflective layer 211 may be located in front of the LED 210. The reflective layer 211 may be disposed on a front surface of the LED 210. The reflective layer 211 may have a multilayer reflective structure in which a plurality of insulating films having different refractive indices are alternately stacked. For example, such a multilayer reflective structure may be a distributed Bragg reflector (DBR) in which a first insulating film having a first refractive index and a second insulating film having a second refractive index are alternately stacked.

Figure 13:
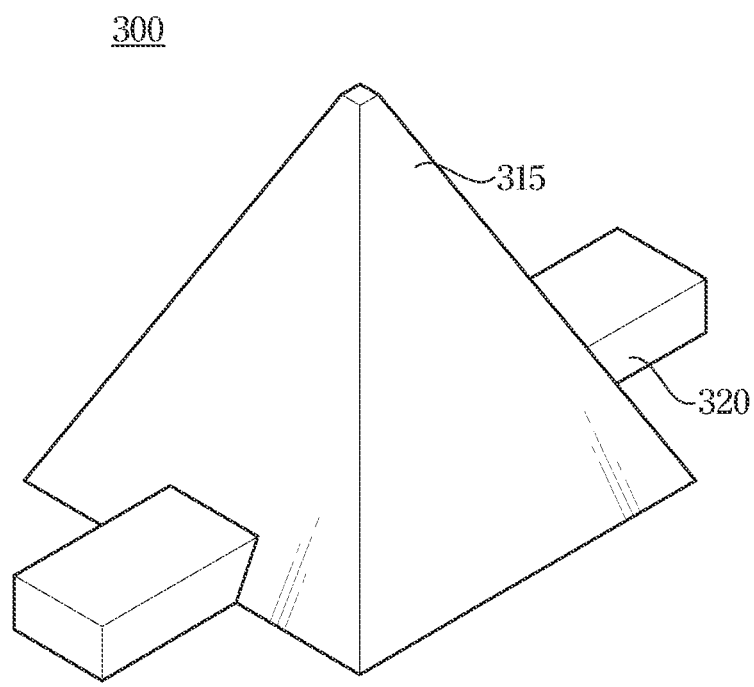
FIG. 13 is a top, perspective view illustrating a supporter including a body formed in a pyramid shape according to an embodiment.
Figure 14:
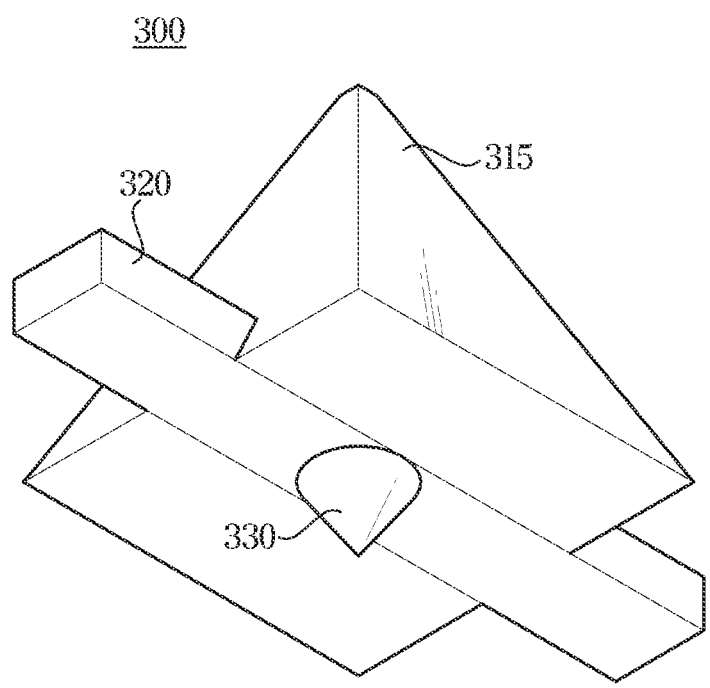
FIG. 14 is a bottom, perspective view illustrating the supporter shown in FIG. 13.

FIG. 13 is a view illustrating a supporter including a body formed in a pyramid shape according to an embodiment. FIG. 14 is a view illustrating the supporter shown in FIG. 13 when viewed in a different direction.

As shown in FIGS. 13 and 14, a body 315 may have a bottom surface 316 in a quadrangular shape. The body 315 may be formed in a pyramidal shape gradually narrowing in an upward direction, which is a direction toward the optical members 130 and 140 (see, e.g., FIG. 10) from a bottom surface 316. Although the bottom surface 316 is shown as having a quadrangular shape on the drawing, it is not limited thereto. That is, the bottom surface 316 of the body 315 may be formed to have a polygonal shape, such as a triangle or a pentagon other than a quadrangular shape.

Figure 15:
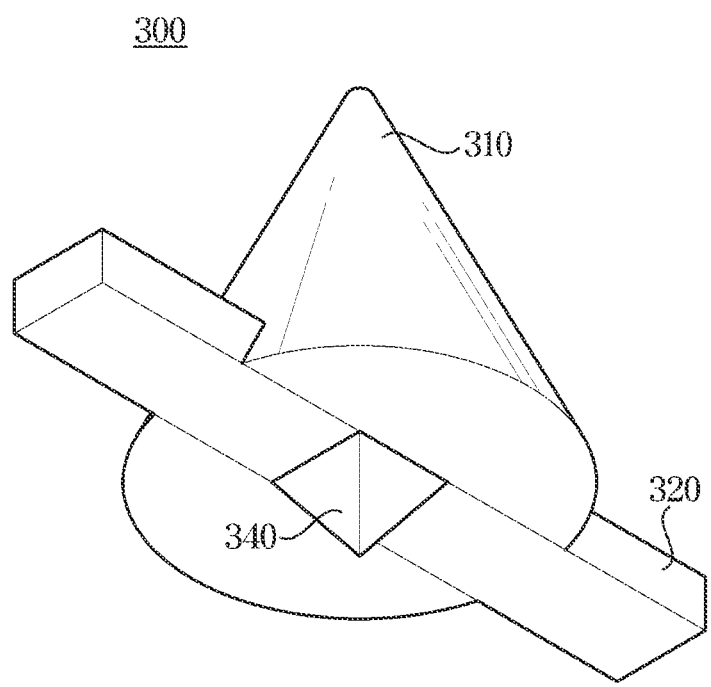
FIG. 15 is a bottom, perspective view illustrating a supporter including a metal portion in a pyramid shape according to an embodiment.

FIG. 15 is a view illustrating a supporter including a metal portion in a pyramid shape according to an embodiment.

As shown in FIG. 15, a metal portion 340 may be formed to protrude from the lower portion of the body 310 toward the bottom chassis 15, which is a metal structure. The metal portion 340 may be formed in the center of the bottom surface 311 of the body 310. The metal portion 340 provided in the center of the body 310 may have an upper surface in a quadrangular shape. The upper surface of the metal portion 340 may be a surface in contact with the circuit pattern portion 320. The metal portion 340 may be formed in a pyramid shape gradually narrowing in a direction from the quadrangular upper surface toward the bottom chassis 15, which is a metal structure. Except that the metal portion 340 is formed in a pyramid shape, other configurations may be the same as those of the supporter 300 shown in FIGS. 7 and 10.

Figure 16:
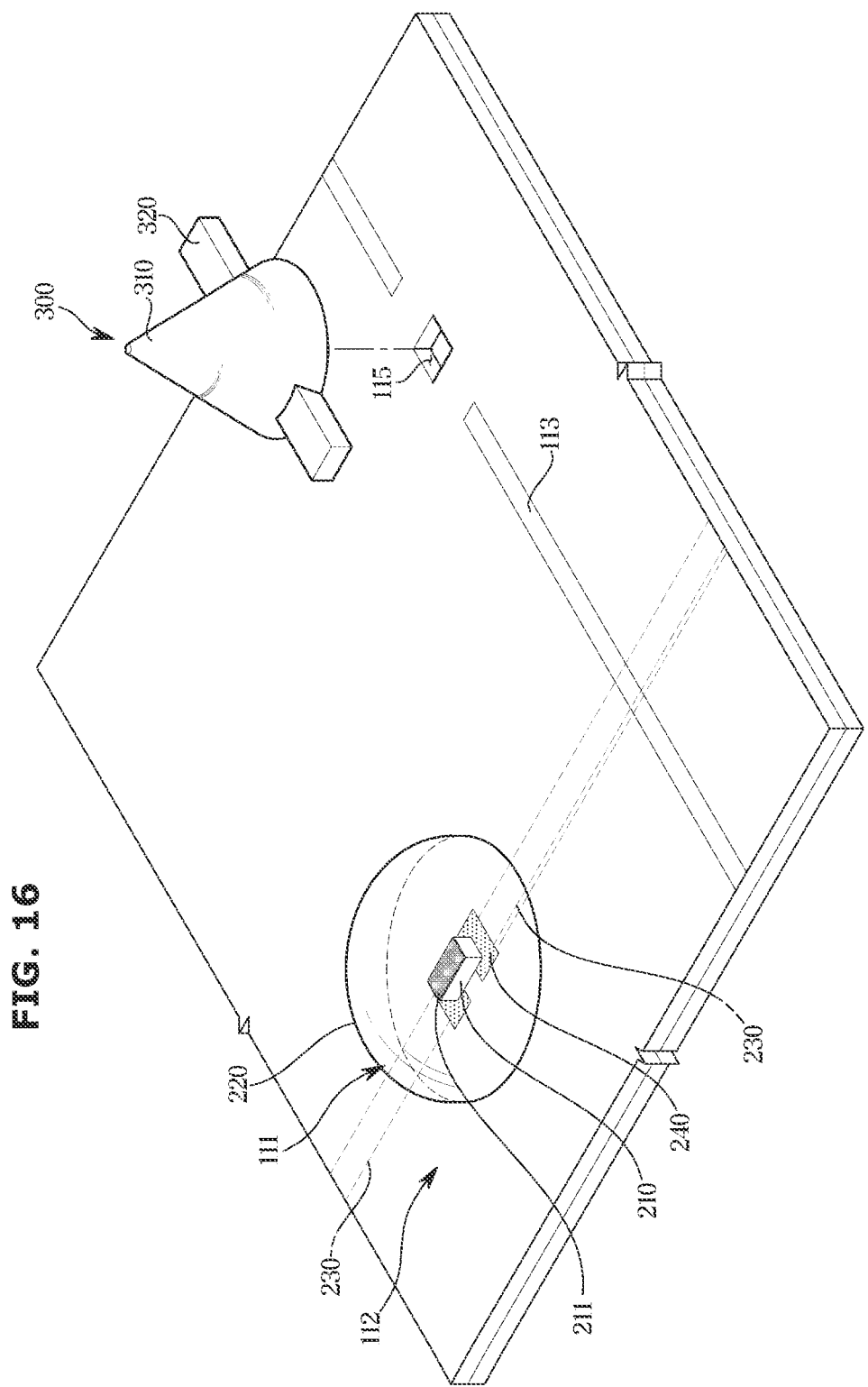
FIG. 16 is a view illustrating a quadrangular through-hole formed in a substrate according to an embodiment.

FIG. 16 is a view illustrating a quadrangular through-hole formed in a substrate according to an embodiment.

As shown in FIG. 16, a through-hole 115 formed in the substrate 112 may have a size smaller than the area of the bottom surface 311 of the body 310 such that the supporter 300 may be mounted on the upper side of the through-hole 115. That is, the through-hole 115 may be formed to have a size in which the body 310 is prevented from being inserted into the through-hole 115 when the supporter 300 is mounted on the upper surface of the substrate 112.

The through-hole 115 may be formed in a quadrangular shape having a size larger than that of the metal portion 330 such that the metal portion 330 may pass therethrough. Although the through-hole 115 is illustrated as being formed in a quadrangular shape on the drawing, it is not limited thereto. That is, the through-hole 115 may be formed to have a polygonal shape, such as a triangle or a pentagon as long as it can allow the metal portion 330 to pass therethrough and come into contact with the bottom chassis 15, which is a metal structure (see, e.g., FIG. 10).

A specific shape and a specific direction of a display apparatus have been described above with reference to the accompanying drawings, but the disclosure may be variously modified and changed by those skilled in the art, and the modifications and changes should be interpreted as being included in the scope of the disclosure.

What is claimed is:

1. A display apparatus comprising:
   an optical member;
   a substrate provided at a rear side of the optical member, the substrate comprising a through-hole and a circuit pattern on a front surface of the substrate;
   a metal structure provided at a rear side of the substrate; and
   a supporter provided on the front surface of the substrate, wherein the supporter comprises:
      a body supporting the optical member, the body being provided on the front surface of the substrate and aligned with the through-hole;
      a circuit pattern portion provided on the body and electrically connected to the circuit pattern on the front surface of the substrate; and
      a metal portion extending from a bottom surface of the body into the through-hole in a direction toward the metal structure, the metal portion being electrically connected to the circuit pattern portion and the metal structure.

2. The display apparatus of claim 1, wherein the supporter is mounted on the front surface of the substrate by a soldered connection and contacts the metal structure.

3. The display apparatus of claim 1, further comprising a plurality of supporters including the supporter,
   wherein the substrate further comprises a plurality of through-holes including the through-hole, and
   wherein each supporter of the plurality of supporters corresponds to a respective through-hole of the plurality of through-holes.

4. The display apparatus of claim 1, wherein the body has a conical shape which tapers toward the optical member.

5. The display apparatus of claim 1, wherein the body has a pyramid shape which tapers toward the optical member.

6. The display apparatus of claim 1, wherein the circuit pattern portion passes through the body and extends parallel to the substrate.

7. The display apparatus of claim 1, wherein the metal portion is provided at a center of the bottom surface of the body and has a conical shape which tapers toward the metal structure.

8. The display apparatus of claim 1, wherein the metal portion is provided at a center the bottom surface of the body and has a pyramid shape which tapers toward the metal structure.

9. The display apparatus of claim 1, wherein the metal structure comprises a bottom chassis that covers the rear side of the substrate.

10. The display apparatus of claim 1, wherein the through-hole has a circular shape, and a diameter of the through-hole is smaller than a width of the bottom surface of the body and larger than a maximum width of the metal portion.

11. The display apparatus of claim 1, wherein the through-hole has a polygonal shape, and a maximum width of the through-hole is smaller than a width of the bottom surface of the body and larger than a maximum width of the metal portion.

12. A display apparatus comprising:
   an optical member;
   a substrate provided at a rear side of the optical member, the substrate comprising a plurality of through-holes and a circuit pattern on a front surface of the substrate;
   a metal structure provided at a rear side of the substrate; and
   a plurality of supporters provided on the front surface of the substrate, the plurality of supporters supporting the optical member and electrically connect the circuit pattern to the metal structure through the plurality of through-holes.

13. The display apparatus of claim 12, wherein each supporter of the plurality of supporters comprises:
   a body provided on the front surface of the substrate and aligned with a corresponding through-hole from among the plurality of through-holes;
   a circuit pattern portion electrically connected to the circuit pattern; and
   a metal portion electrically connecting the circuit pattern portion to the metal structure.

14. The display apparatus of claim 13, wherein the body of each of the plurality of supporters comprises a conical shape that tapers toward the optical member.

15. The display apparatus of claim 14, wherein the metal portion of each of the plurality of supporters extends from the circuit pattern portion through a corresponding through hole of the plurality of through-holes, and contacts the metal structure.

16. The display apparatus of claim 13, wherein the circuit pattern portion of each of the plurality of supporters passes through the body and extends parallel to the substrate.

17. The display apparatus of claim 13, wherein each through-hole of the plurality of through-holes has a width that is smaller than a width of a bottom surface of the body of a corresponding supporter of the plurality of supporters and larger than a maximum width of the metal portion of the corresponding supporter.

18. A display apparatus comprising:
   an optical member;
   a substrate provided at a rear side of the optical member, the substrate comprising a circuit pattern on a front surface of the substrate;
   a metal structure provided at a rear side of the substrate; and
   a supporter provided on the front surface of the substrate and supporting the optical member,
   wherein the supporter comprises:
      a circuit pattern portion electrically connected to the circuit pattern; and
      a metal portion electrically connecting the circuit pattern portion to the metal structure.

19. The display apparatus of claim 18, further comprising a plurality of supporters including the supporter,
   wherein the substrate further comprises a plurality of through-holes,
   wherein each supporter of the plurality of supporters corresponds to a respective through-hole of the plurality of through-holes, and
   wherein the metal portion of each supporter of the plurality of supporters extends through a corresponding through-hole of the plurality of through-holes.

20. The display apparatus of claim 19, wherein each supporter of the plurality of supporters further comprises a body provided on the front surface of the substrate, and
   wherein the metal portion of each supporter of the plurality of supporters extends from a bottom surface of the body in a direction toward the metal structure.

* * * * *